United States Patent
Ichino et al.

(10) Patent No.: US 9,914,820 B2
(45) Date of Patent: Mar. 13, 2018

(54) LUMPS AND COMPOSITION

(71) Applicant: Mitsui Chemicals, Inc., Minato-ku, Tokyo (JP)

(72) Inventors: Kotaro Ichino, Ichihara (JP); Yoshiharu Kikuchi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/783,337

(22) PCT Filed: Apr. 9, 2014

(86) PCT No.: PCT/JP2014/060260
§ 371 (c)(1),
(2) Date: Oct. 8, 2015

(87) PCT Pub. No.: WO2014/168168
PCT Pub. Date: Oct. 16, 2014

(65) Prior Publication Data
US 2016/0053080 A1 Feb. 25, 2016

(30) Foreign Application Priority Data

Apr. 12, 2013 (JP) .................................. 2013-083916

(51) Int. Cl.
C08K 5/00 (2006.01)
C08L 23/16 (2006.01)
C08J 3/00 (2006.01)
C08J 3/20 (2006.01)
C08F 210/18 (2006.01)

(52) U.S. Cl.
CPC .......... C08K 5/0016 (2013.01); C08F 210/18 (2013.01); C08J 3/005 (2013.01); C08J 3/203 (2013.01); C08L 23/16 (2013.01); *C08J 2321/00* (2013.01); *C08J 2423/08* (2013.01)

(58) Field of Classification Search
CPC ....... C08F 210/18; C08K 5/01; C08K 5/0016; C08J 3/005; C08J 3/203
USPC ................................................. 524/554, 528
See application file for complete search history.

(56) References Cited

U.S. PATENT DOCUMENTS

| | | | |
|---|---|---|---|
| 4,990,640 | A | 2/1991 | Tsutsui et al. |
| 5,733,983 | A | 3/1998 | Hakuta et al. |
| RE37,527 | E | 1/2002 | Hakuta et al. |
| 6,337,364 | B1 | 1/2002 | Sakaki et al. |
| 6,346,577 | B1 | 2/2002 | Hakuta et al. |
| 6,939,928 | B1 | 9/2005 | Kawai et al. |
| 2005/0250894 | A1 | 1/2005 | Norris et al. |
| 2005/0228155 | A1 | 10/2005 | Kawai et al. |
| 2006/0161013 | A1 | 7/2006 | Tohi et al. |
| 2008/0220193 | A1 | 9/2008 | Tohi et al. |
| 2011/0046290 | A1 | 2/2011 | Toyoda et al. |
| 2014/0296423 | A1 | 10/2014 | Ebata et al. |

FOREIGN PATENT DOCUMENTS

| | | |
|---|---|---|
| CN | 1294147 A | 5/2001 |
| JP | H02-078687 A | 3/1990 |
| JP | H02-233740 A | 9/1990 |
| JP | H09-151283 A | 6/1997 |
| JP | H09-272767 A | 10/1997 |
| JP | 2000-212194 A | 8/2000 |
| JP | 2000-230090 A | 8/2000 |
| JP | 2001-270957 A | 10/2001 |
| JP | 2001-522398 A | 11/2001 |
| JP | 2002-146125 A | 5/2002 |
| JP | 2004-168744 A | 6/2004 |
| JP | 2004-175759 A | 6/2004 |
| JP | 2004-210822 A | 7/2004 |
| JP | 2005-538195 A | 12/2005 |
| JP | 2007-099942 A | 4/2007 |
| JP | 2008-248045 A | 10/2008 |
| JP | 2011-001497 A | 1/2011 |
| JP | 2011-016907 A | 1/2011 |
| JP | 2012-214577 A | 11/2012 |
| WO | WO-98/49212 A1 | 11/1998 |
| WO | WO-01/27124 A1 | 4/2001 |
| WO | WO-2006/123759 A1 | 11/2006 |
| WO | WO-2009/081794 A1 | 7/2009 |
| WO | WO 2013/054882 * | 4/2013 |
| WO | WO-2013/054882 A1 | 4/2013 |

OTHER PUBLICATIONS

Patsidis et al., "The synthesis, characterization and polymerization behavior of ansa cyclopentadienyl fluorenyl complexes; the X-ray structures of the complexes [(C13H8)SiR2(C5H4))]ZrCl2 (R=Me or Ph)", Journal of Organometallic Chemistry,vol. 509, 1996, pp. 63-71.
Randall et al., "Ethylene-1-Butene Copolymers. 1. Comonomer Sequence Distribution", Macromolecules, vol. 15, 1982, pp. 353-360.
Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, Jul.-Aug. 1977, pp. 773-778.
International Search Report issued in PCT/JP2014/060260 dated Jun. 17, 2014.
Extended European Search Report issued in European Patent Application No. 14782123.5 dated Aug. 23, 2016.
Office Action issued in Chinese Patent Application No. 201480019194.8 dated Jul. 26, 2016.

* cited by examiner

*Primary Examiner* — Deve E Valdez
(74) *Attorney, Agent, or Firm* — Foley & Lardner LLP

(57) ABSTRACT

Provided is a lump that is suitable to be used with rubber and compounding agents in producing rubber products with low hardness, of which an uniform kneaded product can be quickly obtained while kneading to produce rubber products, and that does not easily change its shape even when stored for a long period of time.

8 Claims, No Drawings

LUMPS AND COMPOSITION

TECHNICAL FIELD

The present invention relates to lumps comprising ethylene based polymers.

BACKGROUND ART

Rubber products typified by crosslinked rubber, when, for instance, used in rolls or packing, often require those with low hardness. In order to maintain low hardness and properties, the composition needs to be considered carefully.

Meanwhile, rubber products including crosslinked rubber are processed in a kneading apparatus so that materials such as rubber, filler and softener are mixed evenly, after which crosslinking is performed by adding crosslinking agents and crosslinking aids. In this case, it may not be possible to knead a large amount of materials if a kneading apparatus is overloaded, which consequently undermines productivity.

An attempt was made to lower the kneading load by pouring oil used for extender oil in order to obtain rubber product with low hardness (Background Art of Patent Literature 1).

CITATION LIST

Patent Literature

Patent Literature 1: JP-A-2012-214577

SUMMARY OF INVENTION

Technical Problem

However, the oil described above is rather known to deteriorate productivity for it takes time to mix, and the obtained mixture is often not uniform. Further, oil, for its amorphous shape, requires tanks or containers near the kneading apparatus when used in a large amount, and thus, an improvement is deemed desirable from the viewpoint of saving facilities.

In order to enhance productivity, an attempt may be made with EPT, which has low viscosity, rather than oil. The use of EPT has certain effect of producing an uniform mixture by lowering the viscosity, but increases the hardness at the same time, thereby being unable to produce rubber products with low hardness. EPT with low viscosity is often in the form of bale as a product form, but inventors of the present invention have found out through study that EPT may strain whilst in storage, which makes it difficult to be removed from the storage or to be poured into a kneading apparatus for its shape may not be suitable to fit into the entrance of the kneading apparatus. In order to prevent this, it is deemed that there are improvements to be made such as installing special facilities (installing a barrier to prevent strain during storage, et al).

Solution to Problem

An objective of the present invention is to provide a lump that is suitable to be used with rubber and compounding agents in producing rubber products with low hardness, of which an uniform kneaded product can be quickly obtained while kneading to produce rubber products, and that does not easily change its shape even when stored for a long period of time (hereinafter referred to as "having an excellent shape retainability"). The present invention also aims to provide methods of producing such lumps. The present invention aims to provide methods of producing rubber composition using the lumps.

Further objectives of the present invention are to provide a composition that is suitable to be used with rubber and compounding agents in producing rubber products with low hardness, of which an uniform kneaded product is quickly obtained while kneading to produce rubber products, and that does not easily change its shape even when stored for a long time, and methods of producing thereof.

After carrying out a close study to solve these problems, it was discovered that a particular ethylene copolymer (X) is capable of mixing plasticizers such as oil in large amounts, of which plasticizers and copolymers are mixed uniformly, has a high shape retainability, and is able to solve all of the above-described problems, and thus, completed the present invention.

The present invention is directed to the following.

[1] A lump comprising 100 parts by mass of ethylene copolymer (X) which comprises a structural unit derived from ethylene [A], a structural unit derived from α-olefin [B] having 3 to 20 carbon atoms, and a structural unit derived from at least one component [C] selected from the group consisting of (c-1) polyene and (c-2) cyclic olefin, and which satisfies (1) to (3) below, and 750 to 2,000 parts by mass of plasticizer (Y); wherein (1) the structural unit derived from ethylene [A] represents 50 to 90 mol % in 100 mol % of a total of the structural unit derived from component [A], the structural unit derived from component [B], and the structural unit derived from component [C] in copolymer (X), (2) the structural unit derived from component [C] represents 1.0 to 5.0 mol % in 100 mol % of a total of the structural unit derived from component [A], the structural unit derived from component [B], and the structural unit derived from component [C] in copolymer (X), and (3) an intrinsic viscosity [η] of ethylene copolymer (X) measured in a decalin solution of 135° C. is 7.8 to 13.0 dl/g.

[2] The lump in [1], wherein an intrinsic viscosity [η] of plasticizer (Y) measured in a decalin solution of 135° C. is not more than 0.2 dl/g·η

[3] The lump in [1] or [2], which has a mass of 1 kg to 100 kg.

[4] The lump in [1] to [3], wherein the lump is bale.

[5] A production method of a rubber composition comprising melt kneading of the lump described in [1] to [4], a rubber and compounding agents as needed.

[6] The production method of a rubber composition in [5], wherein the rubber comprises at least one type of ethylene α-olefin non-conjugated polyene copolymer.

[7] A composition (Z) comprising 100 parts by mass of ethylene copolymer (X) which comprises a structural unit derived from ethylene [A], a structural unit derived from α-olefin [B] having 3 to 20 carbon atoms, and a structural unit derived from at least one component [C] selected from the group consisting of (c-1) polyene and (c-2) cyclic olefin, and which satisfies (1) to (3) below, and 1,001 to 2,000 parts by mass of plasticizer (Y); wherein (1) the structural unit derived from ethylene [A] represents 50 to 90 mol % in 100 mol % of a total of the structural unit derived from component [A], the structural unit derived from component [B], and the structural unit derived from component [C] in copolymer (X);

(2) the structural unit derived from component [C] represents 1.0 to 5.0 mol % in 100 mol % of a total of the structural unit derived from component [A], the structural unit derived from component [B] and the structural unit derived from component [C] in copolymer (X); and (3) an intrinsic viscosity [η] of ethylene copolymer (X) measured in a decalin solution of 135° C. is 7.8 to 13.0 dl/g.

[8] The composition in [7], wherein an intrinsic viscosity [η] of plasticizer (Y) measured in a decalin solution of 135° C. is not more than 0.2 dl/g.

[9] The composition in [7], wherein the composition (Z) comprises not less than 1,100 parts by mass of the plasticizer (Y) based on 100 parts by mass of the ethylene copolymer (X).

Advantageous Effects of Invention

According to the present invention, an ethylene copolymer lump which includes a large amount of plasticizers while having excellent shape retainability and less bleeding is obtained. The lump is suitable to be used with rubber and compounding agents in producing rubber products with low hardness, of which an uniform kneaded product is quickly obtained while kneading to produce rubber products.

Furthermore, the composition of the present invention is suitable to be used with rubber and compounding agents in producing rubber products with low hardness, of which an uniform kneaded product is quickly obtained while kneading to produce rubber products, and is capable of producing rubber products with low hardness with excellent stretchability.

DESCRIPTION OF EMBODIMENTS

The present invention is described in detail from hereunder, but it should not be limited to the following embodiments.

[Lumps]

The lump of the present invention includes the ethylene copolymer (X) and the plasticizer (Y).

The mass of the lump is generally 100 g to 1,000 kg, preferably 1 kg to 500 kg, more preferably 1 kg to 300 kg, even more preferably 1 kg to 100 kg, particularly 12 kg to 70 kg, more particularly 15 kg to 50 kg and even more particularly 18 kg to 40 kg. The shape of the lump is not particularly limited.

Lump of not more than 50 kg in mass is easy to be carried by men, is excellent in workability and is suitable for many types of kneading apparatus.

The lump of the present invention may be divided by cutting another lump into not lessthan two pieces.

The density of the lump is generally 0.6 to 3.0 kg/m$^3$, particularly preferably 0.65 to 2.0 kg/m$^3$, even more preferably 0.70 to 1.0 kg/m$^3$, more preferably 0.75 to 0.90 kg/m$^3$ and even more preferably 0.80 to 0.90 kg/m$^3$.

Example of the lump is not particularly limited, but specifically, there are lumps in the form of so-called bale as well as solids including pellets.

The bale and solids may be wrapped with a packaging bag, or may be at least partially covered with wrapping film, or, for instance, may be wrapped with a packaging bag while being at least partially covered with wrapping film.

The Ethylene Copolymer (X)

The ethylene copolymer (X) according to the present invention includes a structural unit derived from ethylene [A], a structural unit derived from α-olefin [B] having 3 to 20 carbon atoms and a structural unit derived from at least one component [C] selected from the group consisting of (c-1) polyene and (c-2) cyclic olefin. The ethylene copolymer (X) is an ethylene copolymer characterized in that:

(1) The structural unit derived from ethylene [A] represents 50 to 90 mol %, preferably 55 to 85 mol %, and more preferably 55 to 83 mol % in 100 mol % of a total of the structural unit derived from component [A], the structural unit derived from component [B] and the structural unit derived from component [C] in the ethylene copolymer (X);

(2) The structural unit derived from component [C] represents 1.0 to 5.0 mol %, preferably 1.0 to 4.0 mol %, and more preferably 1.0 to 3.5 mol % in 100 mol % of a total of the structural unit derived from component [A], the structural unit derived from component [B] and the structural unit derived from component [C] in the ethylene copolymer (X); and (3) An intrinsic viscosity [η] of the ethylene copolymer (X) measured in a decalin solution of 135° C. is 7.8 to 13.0 dl/g, preferably 8.0 to 13.0 dl/g, more preferably 8.0 to 12.0 dl/g, and even more preferably 8.5 to 12.0 dl/g.

The above (1) to (3) are described in detail from hereunder.

<(1) [A] Ethylene>

The structural unit derived from ethylene [A] (hereinafter, also referred to as "component [A]") represents, as described above range, 50 to 90 mol %, preferably 55 to 85 mol %, and more preferably 55 to 83 mol % in 100 mol % of a total of the structural unit derived from component [A], the structural unit derived from component [B] and the structural unit derived from component [C] in the inventive ethylene copolymer (X).

The proportion of the structural unit derived from ethylene [A] in 100 mol % of a total of the structural unit derived from component [A], the structural unit derived from component [B] and the structural unit derived from component [C] in the inventive copolymer (X) may be measured by any of various known methods. For example, the proportion may be determined by measuring a $^1$H-NMR spectrum.

<[B] α-Olefins of 3 to 20 Carbon Atoms>

The ethylene copolymer (X) according to the invention includes structural unit derived from α-olefins [B] of 3 to 20 carbon atoms (hereinafter, also referred to as "component [B]").

From the viewpoints of material costs, mechanical characteristics of the inventive copolymer (X), and rubber elasticity of shaped articles obtained from a composition described later which includes the copolymer, the number of carbon atoms in component [B] is preferably 3 to 20. Preferably, the α-olefin has 3 to 8 carbon atoms, and is more preferably propylene or 1-butene, and particularly preferably propylene.

Examples of component [B] include propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. Of these, propylene, 1-butene, 1-hexene and 1-octene are preferable, propylene and 1-butene are more preferable, and propylene is particularly preferable.

Component [B] may be used singly, or two or more kinds may be used in combination.

In terms of flexibility of the inventive copolymer (X), the structural unit derived from component [B] represents usually 9 to 49 mol %, preferably 14 to 44 mol %, and more preferably 16 to 44 mol % in 100 mol % of a total of the structural unit derived from component [A], the structural unit derived from component [B] and the structural unit derived from component [C].

The proportion of the structural unit derived from ethylene [B] in 100 mol % of a total of the structural unit derived from component [A], the structural unit derived from component [B] and the structural unit derived from component

[C] in the inventive copolymer (X) may be measured by any of various known methods. For example, the proportion may be determined by measuring a $^1$H-NMR spectrum.

<(2) At least one component [C] selected from the group consisting of (c-1) polyene and (c-2) cyclic olefin>

Structural unit derived from at least one component [C] selected from the group consisting of (c-1) polyene and (c-2) cyclic olefin (hereinafter, also referred to as "component [C]") is described hereinbelow.

Polyene [c-1] (hereinafter, also referred to as "component [c-1]"), which can be used as component [C] in the invention, is not particularly limited as long as the compound has two or more (usually four or less) double bonds and the double bonds are not conjugated. From the viewpoint of costs, however, non-conjugated dienes of 5 to 20 carbon atoms are preferable, and non-conjugated dienes of 5 to 15 carbon atoms are more preferable.

Examples of the non-conjugated dienes include cyclic non-conjugated dienes such as 5-ethylidene-2-norbornene (ENB), dicyclopentadiene, 5-vinyl-2-norbornene (VNB), norbornadiene and methyltetrahydroindene, and chain non-conjugated dienes such as 1,4-hexadiene and 7-methyl-1,6-octadiene.

Of these, 5-ethylidene-2-norbornene (ENB), dicyclopentadiene and 5-vinyl-2-norbornene (VNB) are preferably used, and 5-ethylidene-2-norbornene (ENB) is particularly preferably used.

Cyclic olefin [c-2], which may be used as component [C] in the invention, is an unsaturated cyclic hydrocarbon having one carbon-carbon double bond in the ring. Specific examples of the cyclic olefins include cyclopentene, cycloheptene, cyclohexene, norbornene, 5-methyl-2-norbornene, tetracyclododecene and 2-methyl-1,4,5,8-dimethano-1,2,3,4,4a,5,8,8a-octahydro-naphthalene.

Component [C] in the invention may be used singly, or two or more kinds may be used in combination. The proportion of the structural unit derived from component [C] in 100 mol % of a total of the structural unit derived from component [A], the structural unit derived from component [B] and the structural unit derived from component [C] in the inventive copolymer may be measured by any of various known methods. For example, the proportion may be determined by measuring a $^1$H-NMR spectrum.

In the ethylene copolymer (X) of the invention, component [C] is preferably a non-conjugated polyene; in particular, a non-conjugated diene is preferable, and 5-ethylidene-2-norbornene (ENB) is particularly preferable.

<(3) Intrinsic Viscosity [η]>

The ethylene copolymer (X) of the invention has an intrinsic viscosity [η] in the aforementioned range as measured in a decalin solution of 135° C. This ensures that excellent shape retainability and bleed resistance are exhibited even when it contains a large amount of plasticizers. The ethylene copolymer (X) with an intrinsic viscosity [η] in the aforementioned range, when formed into a composition by adding a large amount of plasticizers, may produce a composition of low viscosity, but exhibits excellent kneading properties with other types of rubber or compounding agent.

The ethylene copolymer (X) of the invention preferably has: (i) a value B of 0.9 to 1.1, more preferably 0.9 to 1.0, the value B being obtained from a $^{13}$C-NMR spectrum and from the following formula. When within the range, for example, the lump or composition in the invention which is formed by adding a plasticizer can achieve excellent strength, and thus, is more appropriate for storage and handling during usage.

Value $B=[P_{OE}]/(2\cdot[P_E]\cdot[P_O])$ (In the formula, $[P_E]$ is the molar fraction of the content of the unit derived from ethylene (a) in the random copolymer, $[P_O]$ is the molar fraction of the content of the unit derived from the α-olefin (b) in the random copolymer, and $[P_{OE}]$ is the proportion of the number of α-olefin·ethylene chains relative to the number of all the dyad chains in the random copolymer); and, The value B is an indicator of the distribution state of ethylene and the α-olefin in the ethylene copolymer (X), and may be determined based on the reports by J. C. Randall (Macromolecules, 15, 353 (1982)) and J. Ray (Macromolecules, 10, 773 (1977)).

The ethylene copolymer satisfying the above (i) achieves excellent rubber characteristics at a low temperature region.

[Methods for Producing Ethylene Copolymers (X)]

The ethylene copolymers (X) may be produced using metallocene catalysts. In detail, the copolymers can be produced by the following methods.

Catalyst Example 1

Examples of the metallocene catalysts include transition metal compounds represented by General Formula [I] or [II] below.

[General Formula 1]

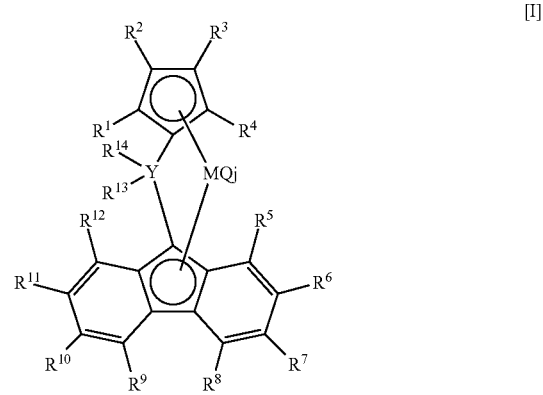

[General Formula 2]

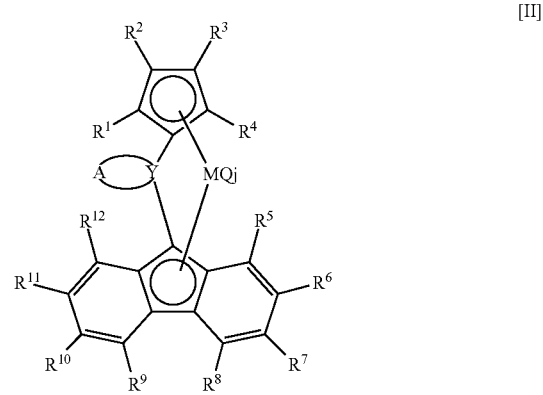

In General Formulae [I] and [II], Y is a silicon atom or a carbon atom.

In General Formulae [I] and [II], $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$ may be the same or different from one another and are each selected from a hydrogen atom, a halogen atom, an optionally halogenated hydrocarbon group of 1 to 20 carbon atoms and a silicon-containing group, and adjacent substituents of $R^1$ to $R^{14}$ may be linked to each other to form a ring.

Examples of the halogen atoms include fluorine atom, chlorine atom, bromine atom and iodine atom.

Examples of the hydrocarbon groups of 1 to 20 carbon atoms include alkyl groups of 1 to 20 carbon atoms, arylalkyl groups of 7 to 20 carbon atoms, aryl groups of 6 to 20 carbon atoms and substituted aryl groups.

Specific examples include methyl group, ethyl group, n-propyl group, isopropyl group, allyl group, n-butyl group, isobutyl group, sec-butyl group, t-butyl group, amyl group, n-pentyl group, neopentyl group, n-hexyl group, n-heptyl group, n-octyl group, n-nonyl group, n-decanyl group, 3-methylpentyl group, 1,1-diethylpropyl group, 1,1-dimethylbutyl group, 1-methyl-1-propylbutyl group, 1,1-propylbutyl group, 1,1-dimethyl-2-methylpropyl group, 1-methylisopropyl-2-methylpropyl group, cyclopentyl group, cyclohexyl group, cycloheptyl group, cyclooctyl group, norbornyl group, adamantyl group, phenyl group, o-tolyl group, m-tolyl group, p-tolyl group, xylyl group, isopropylphenyl group, t-butylphenyl group, naphthyl group, biphenyl group, terphenyl group, phenanthryl group, anthracenyl group, benzyl group and cumyl group. Examples of the hydrocarbon groups further include those containing oxygen-containing groups such as methoxy group, ethoxy group and phenoxy group, nitrogen-containing groups such as nitro group, cyano group, N-methylamino group, N,N-dimethylamino group and N-phenylamino group, boron-containing groups such as boranetriyl group and diboranyl group, and sulfur-containing groups such as sulfonyl group and sulfenyl group.

Any hydrogen atoms of the above hydrocarbon groups may be substituted by halogen atoms. Examples of such halogenated hydrocarbon groups include trifluoromethyl group, trifluoromethylphenyl group, pentafluorophenyl group and chlorophenyl group.

Examples of the silicon-containing groups include silyl groups, siloxy groups, hydrocarbon-substituted silyl groups and hydrocarbon-substituted siloxy groups. Specific examples include methylsilyl group, dimethylsilyl group, trimethylsilyl group, ethylsilyl group, diethylsilyl group, triethylsilyl group, diphenylmethylsilyl group, triphenylsilyl group, dimethylphenylsilyl group, dimethyl-t-butylsilyl group and dimethyl(pentafluorophenyl)silyl group.

Examples of the cyclopentadienyl groups with $R^1$ to $R^4$ in General Formulae [I] and [II] include but are not limited to unsubstituted cyclopentadienyl group in which $R^1$ to $R^4$ are hydrogen atoms; 3-monosubstituted cyclopentadienyl groups such as 3-t-butylcyclopentadienyl group, 3-methylcyclopentadienyl group, 3-trimethylsilylcyclopentadienyl group, 3-phenylcyclopentadienyl group, 3-adamantylcyclopentadienyl group, 3-amylcyclopentadienyl group and 3-cyclohexylcyclopentadienyl group; and 3,5-disubstituted cyclopentadienyl groups such as 3-t-butyl-5-methylcyclopentadienyl group, 3-t-butyl-5-ethylcyclopentadienyl group, 3-phenyl-5-methylcyclopentadienyl group, 3,5-di-t-butylcyclopentadienyl group, 3,5-dimethylcyclopentadienyl group, 3-phenyl-5-methylcyclopentadienyl group and 3-trimethylsilyl-5-methylcyclopentadienyl group.

The unsubstituted ($R^1$ to $R^4$ being hydrogen atoms) cyclopentadienyl group is preferable because of easy synthesis of the transition metal compounds, production costs, and performance in the copolymerization of the non-conjugated polyenes [C].

Examples of the fluorenyl groups with $R^5$ to $R^{12}$ in General Formulae [I] and [II] include but are not limited to unsubstituted fluorenyl group in which $R^5$ to $R^{12}$ are hydrogen atoms; 2-monosubstituted fluorenyl groups such as 2-methylfluorenyl group, 2-t-butylfluorenyl group and 2-phenylfluorenyl group; 4-monosubstituted fluorenyl groups such as 4-methylfluorenyl group, 4-t-butylfluorenyl group and 4-phenylfluorenyl group; 2,7- or 3,6-disubstituted fluorenyl groups such as 2,7-di-t-butylfluorenyl group and 3,6-di-t-butylfluorenyl group; 2,3,6,7-tetrasubstituted fluorenyl groups such as 2,7-dimethyl-3,6-di-t-butylfluorenyl group and 2,7-diphenyl-3,6-di-t-butylfluorenyl group; and 2,3,6,7-tetrasubstituted fluorenyl groups represented by General Formulae [V-I] and [V-II] below wherein $R^6$ and $R^7$ are linked together to form a ring and $R^{10}$ and $R^{11}$ are linked together to form a ring.

[General Formula 3]

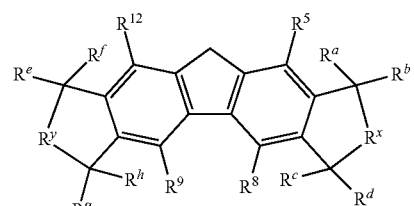

[V-I]

[General Formula 4]

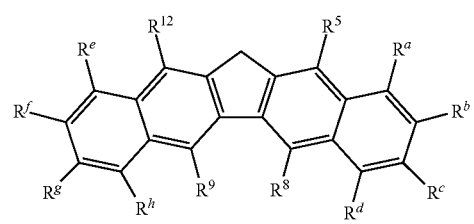

[V-II]

In General Formulae [V-I] and [V-II], $R^5$, $R^8$, $R^9$ and $R^{12}$ are the same as defined in General Formula [I] or [II]; and $R^a$, $R^b$, $R^c$, $R^d$, $R^e$, $R^f$, $R^g$ and $R^h$ are each independently a hydrogen atom or an alkyl group of 1 to 5 carbon atoms, and may be linked to adjacent substituents to form a ring.

Specific examples of the alkyl groups include methyl group, ethyl group, n-propyl group, isopropyl group, n-butyl group, t-butyl group, amyl group and n-pentyl group.

In General Formula [V-I], $R^x$ and $R^y$ are each independently a hydrocarbon group of 1 to 3 carbon atoms which may have an unsaturated bond; $R^x$ may form a double bond with the carbon atom to which $R^a$ or $R^c$ is bonded; $R^y$ may form a double bond with the carbon atom to which $R^e$ or $R^g$ is bonded; and $R^x$ and $R^y$ are preferably both saturated or unsaturated hydrocarbon groups of 1 or 2 carbon atoms.

Specific examples of the compounds represented by General Formula [V-I] or [V-II] include octamethyloctahydrodibenzofluorenyl group of Formula [V-III] below, tetramethyldodecahydrodibenzofluorenyl group of Formula [V-IV] below, octamethyltetrahydrocyclopentafluorenyl group of Formula [V-V] below, hexamethyldihydrodicyclopentafluorenyl group of Formula [V-VI] below and b,h-dibenzofluorenyl group of Formula [V-VII] below.

[General Formula 5]

[V-III]

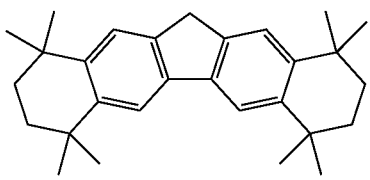

[General Formula 6]

[V-IV]

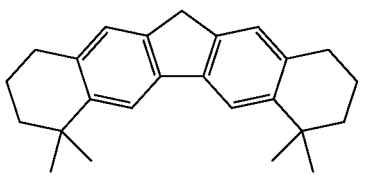

[General Formula 7]

[V-V]

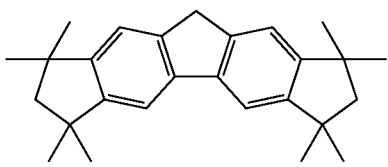

[General Formula 8]

[V-VI]

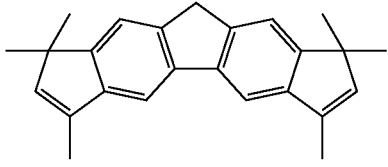

[General Formula 9]

[V-VII]

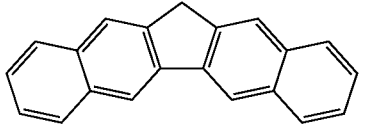

The transition metal compounds of General Formula [I] or [II] containing these fluorenyl groups each shows an excellent performance in the copolymerization of the at least one polyene and/or the cyclic olefin [C]. When Y is a silicon atom, the transition metal compounds that have a 2,7-disubstituted fluorenyl group, a 3,6-disubstituted fluorenyl group, a 2,3,6,7-tetrasubstituted fluorenyl group or a 2,3,6,7-tetrasubstituted fluorenyl group of General Formula [V-I] show particularly excellent performance. When Y is a carbon atom, the transition metal compounds that have an unsubstituted fluorenyl group with $R^5$ to $R^{12}$ being hydrogen atoms, a 3,6-disubstituted fluorenyl group, a 2,3,6,7-tetrasubstituted fluorenyl group or a 2,3,6,7-tetrasubstituted fluorenyl group of General Formula [V-I] show a particularly excellent performance in the copolymerization of the non-conjugated polyenes [C].

In both cases in which Y is a silicon atom or a carbon atom, particularly excellent polymerization activity is achieved by the transition metal compounds of General Formulae [I] and [III] which have a 2,7-disubstituted fluorenyl group, a 3,6-disubstituted fluorenyl group, a 2,3,6,7-tetrasubstituted fluorenyl group or a 2,3,6,7-tetrasubstituted fluorenyl group of General Formula [V-I].

In General Formula [I], $R^{13}$ and $R^{14}$ may be the same or different from each other. As already mentioned, $R^{13}$ and $R^{14}$ may be hydrocarbon groups. Of the hydrocarbon groups, methyl group, ethyl group, n-propyl group, isopropyl group, n-butyl group, isobutyl group, t-butyl group, cyclopentyl group, cyclohexyl group, cycloheptyl group, phenyl group, m-tolyl group, p-tolyl group, 4-t-butylphenyl group, p-chlorophenyl group, 4-biphenyl group, 2-naphthyl group, xylyl group, benzyl group and m-trifluoromethylphenyl group are preferable.

In the transition metal compounds represented by General Formula [II], A is a divalent and saturated or unsaturated hydrocarbon group of 2 to 20 carbon atoms which may include an aromatic ring, and Y and A are linked together to form, for example, a structure such as a cycloalkylidene group such as cyclohexylidene group represented by Formula [VI-I] below or a cyclomethylenesilylene group such as cyclotetramethylenesilylene group (1-silacyclopentylidene group) represented by Formula [VI-II] below.

[General Formula 10]

[VI-I]

[VI-II]

(In Formulae [VI-I] and [VI-II], the black dots ● represent bonding points with the (substituted) cyclopentadienyl group and the (substituted) fluorenyl group in General Formula [II].)

In General Formula [II], the group A may contain two or more ring structures including the ring it forms with Y.

Specific examples of the ring structures formed by the bonding of Y with A, other than the cyclohexylidene group represented by Formula [VI-I] above, include cyclopropylidene group, cyclobutylidene group, cyclopentylidene group, cycloheptylidene group, cyclooctylidene group, bicyclo[3.3.1]nonylidene group, norbornylidene group, adamantylidene group, tetrahydronaphthylidene group and dihydroindanylidene group.

Similarly, specific examples of the ring structures formed by the bonding of Y with A, other than the cyclotetramethylenesilylene group (1-silacyclopentylidene group) represented by Formula [VI-II] above, include cyclodimethylenesilylene group, cyclotrimethylenesilylene group, cyclopentamethylenesilylene group, cyclohexamethylenesilylene group and cycloheptamethylenesilylene group.

In General Formulae [I] and [III], M is a titanium atom, a zirconium atom or a hafnium atom, and is preferably a titanium atom or a hafnium atom.

In General Formulae [I] and [III], Q is selected from halogen atoms, hydrocarbon groups of 1 to 10 carbon atoms, neutral and conjugated or non-conjugated dienes of 10 or less carbon atoms, anionic ligands, and neutral ligands capable of coordination by lone pair electrons.

Specific examples of the halogen atoms include fluorine atom, chlorine atom, bromine atom and iodine atom, with chlorine atom being preferable.

Specific examples of the hydrocarbon groups of 1 to 10 carbon atoms include methyl group, ethyl group, n-propyl group, isopropyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, t-butyl group, 1,1-dimethylbutyl group, 1,1,3-trimethylbutyl group, neopentyl group, cyclohexylmethyl group, cyclohexyl group, 1-methyl-1-cyclohexyl group and benzyl group, with methyl group, ethyl group and benzyl group being preferable.

Specific examples of the neutral and conjugated or nonconjugated dienes of 10 or less carbon atoms include s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene, and s-cis- or s-trans-$\eta^4$-1,4-bis(trimethylsilyl)-1,3-butadiene.

Specific examples of the anionic ligands include alkoxy groups such as methoxy, t-butoxy and phenoxy, carboxylate groups such as acetate and benzoate, and sulfonate groups such as mesylate and tosylate.

Specific examples of the neutral ligands capable of coordination by lone electron pairs include organophosphorus compounds such as trimethylphosphine, triethylphosphine, triphenylphosphine and diphenylmethylphosphine, and ethers such as tetrahydrofuran, diethyl ether, dioxane and 1,2-dimethoxyethane.

Lastly, j in General Formulae [I] and [II] is an integer of 1 to 4. When j is 2 or greater, the plurality of Q may be the same or different from one another.

Examples of the transition metal compounds discussed above are described in JP-A-2011-1497.

The transition metal compounds may be produced by known methods, and the production methods are not particularly limited. Exemplary production methods are described in J. Organomet. Chem., 63, 509 (1996) and WO 2006-123759, WO 01/27124, JP-A-2004-168744, JP-A-2004-175759 and JPA-2000-212194 filed by the present applicant.

Catalyst Example 2

Examples of the metallocene catalysts which may be used in the production of the inventive ethylene copolymers (X) further include compounds represented by General Formula (X) below.

[General Formula 11]

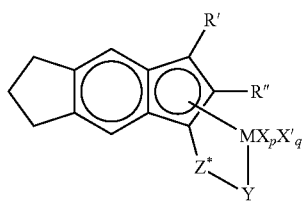

(X)

In Formula (X), R' and R" are each independently a hydrogen atom or a hydrocarbyl group of 1 to 20 carbon atoms, M is titanium, Y is —NR*—, Z* is —SiR*$_2$—, the two R*s are each independently a hydrogen atom or a hydrocarbyl group of 1 to 20 carbon atoms, p and q are such that one is 0 and the other is 1, when p is 0 and q is 1, M is in the +2 oxidized state and X' is 1,4-diphenyl-1,3-butadiene or 1,3-pentadiene, and when p is 1 and q is 0, M is in the +3 oxidized state and X is 2-(N,N-dimethylamino)benzyl.

From the viewpoint that the obtainable ethylene copolymer is suppressed from the occurrence of fogging and stickiness due to ultralow-molecular weight components, a particularly preferred compound having a structure represented by General Formula (X) is (t-butylamido)dimethyl ($\eta^5$-2-methyl-s-indacen-1-yl)silanetitanium (II) 1,3-pentadiene (a compound having a structure represented by Formula (XI) below). For example, the compound having a structure of Formula (XI) below may be obtained by a method described in JP-A-2001-522398.

[General Formula 12]

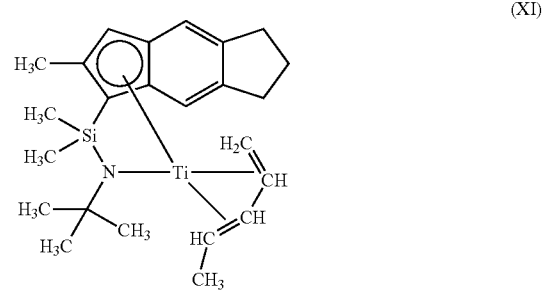

(XI)

The compounds having a structure of General Formula (X) provide excellent polymerizability of the at least one polyene and/or the cyclic olefin [C]. Further, the ethylene copolymer (X) of the invention synthesized with such a metallocene catalyst has a narrow molecular weight distribution and a narrow composition distribution as well as a uniform molecular structure. Thus, copolymer compositions including the inventive copolymer (X) and shaped articles obtained from the compositions tend to achieve an excellent surface appearance.

(Cocatalysts)

For example, the ethylene copolymer (X) of the invention may be synthesized using the above metallocene catalyst as a main catalyst and a boron compound and/or an organoaluminum compound such as a trialkylaluminum as a cocatalyst.

Examples of the boron compounds include trityltetrakis(pentafluorophenyl)borate, trimethylammoniumtetrakis(pentafluorophenyl)borate, di(hydrogenated tallow alkyl)methylammoniumtetrakis(pentafluorophenyl)borate, triethylammoniumtetrakis(pentafluorophenyl)borate, tripropylammoniumtetrakis(pentafluorophenyl)borate, tri(n-butyl)ammoniumtetrakis(pentafluorophenyl)borate, tri(s-butyl)ammoniumtetrakis(pentafluorophenyl)borate, N,N-dimethylaniliniumtetrakis(pentafluorophenyl)borate, N,N-dimethylanilinium-n-butyltris(pentafluorophenyl)borate, N,N-dimethylaniliniumbenzyltris(pentafluorophenyl)borate, N,N-dimethylaniliniumtetrakis(4-(t-butyldimethylsilyl)-2,3,5,6-tetrafluorophenyl)borate, N,N-dimethylaniliniumtetrakis(4-(triisopropylsilyl)-2,3,5,6-tetrafluorophenyl)borate, N,N-dimethylaniliniumpentafluorophenoxytris(pentafluorophenyl)borate, N,N-diethylaniliniumtetrakis(pentafluorophenyl)borate, N,N-dimethyl-2,4,6-trimethylaniliniumtetrakis(pentafluorophenyl)borate, trimethylammoniumtetrakis(2,3,4,6-tetrafluorophenyl)borate, triethylammoniumtetrakis(2,3,4,6-tetrafluorophenyl)borate, tripropylammoniumtetrakis(2,3,4,6-tetrafluorophenyl)borate, N,N-dimethylaniliniumtetrakis(2,3,4,6-tetrafluorophenyl)borate, N,N-diethylaniliniumtetrakis(2,3, 4,6-tetrafluorophenyl)borate and N,N-dimethyl-2,4,6-trimethylaniliniumtetrakis(2,3,4,6-tetrafluorophenyl)borate;

dialkylammonium salts such as di(isopropyl)ammoniumtetrakis(pentafluorophenyl)borate, tri(n-butyl)ammoniumtetrakis(2,3,4,6-tetrafluorophenyl)borate, dimethyl(t-butyl)ammoniumtetrakis(2,3,4,6-tetrafluorophenyl)borate and dicyclohexylammoniumtetrakis(pentafluorophenyl)borate;

trisubstituted phosphonium salts such as triphenylphosphoniumtetrakis(pentafluorophenyl)borate, tri(o-tolyl)phosphoniumtetrakis(pentafluorophenyl)borate and tri(2,6-dimethylphenyl)phosphoniumtetrakis(pentafluorophenyl)borate;

disubstituted oxonium salts such as diphenyloxoniumtetrakis(pentafluorophenyl)borate, di(o-tolyl)oxoniumtetrakis(pentafluorophenyl)borate and di(2,6-dimethylphenyl)oxoniumtetrakis(pentafluorophenyl)borate; and disubstituted sulfonium salts such as diphenylsulfoniumtetrakis(pentafluorophenyl)borate, di(o-tolyl)sulfoniumtetrakis(pentafluorophenyl)borate and bis(2,6-dimethylphenyl)sulfoniumtetrakis(pentafluorophenyl)borate.

Examples of the organoaluminum compounds include trialkylaluminums such as trimethylaluminum, triethylaluminum, triisobutylaluminum and tri-n-octylaluminum, tricycloalkylaluminums, isobutylaluminum dichloride, diethylaluminum chloride, ethylaluminum dichloride, ethylaluminum sesquichloride, methylaluminum dichloride, dimethylaluminum chloride, diisobutylaluminum hydride, LiAl($C_2H_5$)$_4$, LiAl($C_7H_{15}$)$_4$, and organoaluminumoxy compounds.

The organoaluminumoxy compounds may be conventionally known aluminoxanes or may be benzene-insoluble organoaluminumoxy compounds such as those described in JP-A-H02-78687.

<Polymerization Conditions>

The reaction temperature in the synthesis of the inventive ethylene copolymer (X) is usually −20 to 200° C., and preferably 0 to 150° C. The polymerization pressure is usually from above 0 MPa to not more than 8 MPa (gauge pressure), and preferably from above 0 MPa to not more than 5 MPa (gauge pressure).

The reaction time (the average residence time in the case of continuous copolymerization) may vary depending on conditions such as the catalyst concentration and the polymerization temperature, but it is usually 0.5 minutes to 5 hours, and preferably 10 minutes to 3 hours. Further, molecular weight modifiers such as hydrogen may be used.

When the olefins are polymerized with use of the above metallocene catalysts, the transition metal compounds represented by General Formulae [I], [II] and [X] are usually used in $10^{-12}$ to $10^{-2}$ mol, and preferably $10^{-10}$ to $10^{-8}$ mol per 1 liter of the reaction volume.

The cocatalyst used in combination with the transition metal compound is usually used in a molar ratio of the cocatalyst to the total of transition metal atoms (M) in the transition metal compound [cocatalyst/M] of 0.1/1 to 1000/1, and preferably 1/1 to 500/1.

In the invention, the ethylene copolymer may be produced by any of liquid phase polymerization methods such as solution (dissolution) polymerization and suspension polymerization, or gas phase polymerization methods. Although the polymerization method is not particularly limited, it is preferable that the method include a step of obtaining a polymerization reaction liquid described below.

The step of obtaining a polymerization reaction liquid is a step in which the ethylene [A], the component [B], the at least one polyene and/or the cyclic olefin [C] and optionally other monomers are copolymerized in the presence of the metallocene catalyst and the cocatalyst using an aliphatic hydrocarbon as the polymerization solvent to form a polymerization reaction liquid containing a copolymer of the ethylene [A], the component [B], and the at least one polyene and/or the cyclic olefin [C] (and other monomers).

Examples of the polymerization solvents include aliphatic hydrocarbons and aromatic hydrocarbons. Specific examples include aliphatic hydrocarbons such as propane, butane, pentane, hexane, heptane, octane, decane, dodecane and kerosene, alicyclic hydrocarbons such as cyclopentane, cyclohexane and methylcyclopentane, aromatic hydrocarbons such as benzene, toluene and xylene, and halogenated hydrocarbons such as ethylene chloride, chlorobenzene and dichloromethane.

These may be used singly, or two or more kinds may be used in combination. The α-olefin itself subjected to polymerization may be used as the polymerization solvent.

Of the polymerization solvents described above, hexane is preferable from the viewpoints of separation and purification of the ethylene copolymer obtained.

The polymerization reaction may be carried out batchwise, semi-continuously or continuously. Further, the polymerization may be carried out in two or more stages under different reaction conditions.

For example, the polymerization reaction may be performed as described above and may be terminated by the addition of an acidic alcohol such as methanol to the reaction system.

The molecular weight of the ethylene polymer obtained by the polymerization reaction may be controlled by allowing hydrogen to be present in the polymerization system or by changing the polymerization temperature. In detail, reducing the amount of hydrogen in the polymerization system can increase the molecular weight of the obtainable ethylene copolymer and consequently results in an ethylene copolymer having an intrinsic viscosity in the inventive range. By maintaining the polymerization temperature at a moderate temperature and the catalytic activity at a high level, the molecular weight of the obtainable ethylene copolymer can be significantly increased, thereby achieving an intrinsic viscosity in the aforementioned range.

Further, the molecular weight of the ethylene copolymer can be adjusted by controlling the amount of the cocatalyst used.

<Plasticizers (Y)>

Examples of the plasticizers (Y) in the invention include petroleum plasticizers such as process oils (for example, Diana Process Oil PW-380, Diana Process Oil PW-100 (product name, manufactured by Idemitsu Kosan Co., Ltd.) and Diana Process Oil PS-430 (product name, manufactured by Idemitsu Kosan Co., Ltd.)), lubricating oils, paraffin oils, liquid paraffins, petroleum asphalts and vaselines; coal tar plasticizers such as coal tars and coal tar pitches; fatty oil plasticizers such as castor oil, linseed oil, rapeseed oil, soybean oil and coconut oil; waxes such as bees wax, carnauba wax and lanolin; fatty acids and salts thereof such as ricinoleic acid, palmitic acid, stearic acid, barium stearate, calcium stearate and zinc laurate; naphthenic acid, pine oil, rosin and derivatives thereof; synthetic polymer substances such as terpene resins, petroleum resins, atactic polypropylenes, copolymers of ethylene and α-olefins of 3 to 20 carbon atoms (an example may be ethylene.propylene copolymer, but is not limited thereto) and coumarone indene resins; ester plasticizers such as dioctyl phthalate, dioctyl adipate and dioctyl sebacate; and others such as microcrystalline waxes, liquid polybutadienes, modified liquid polybutadienes, liquid thiokols, hydrocarbon-based synthetic lubricating oils, tall oils and rubber substitutes (factices).

Of these, petroleum plasticizers are particularly preferable. The plasticizers (Y) in the invention may be used singly, or two or more kinds may be used in combination.

Of these, petroleum plasticizers or synthetic polymer substances are preferable.

Further, the intrinsic viscosity [η] of the plasticizer measured in a decalin solution of 135° C. is preferably not more than 0.2 dl/g.

The kinematic viscosity of the plasticizer measured at 40° C. is preferably 10 to 40,000 mm$^2$/s. The plasticizer having such property may be expressed as having a liquid phase in the specification.

Also, it is preferred that the viscosity and hardness are lowered when added to a copolymer (X).

Composition of Lumps

For 100 parts by mass of a copolymer (X), the added amount of a plasticizer (Y) is usually 750 to 2,000 parts by mass, 850 to 2,000 parts by mass, 1,000 to 1,800 parts by mass, 1,001 to 1,800 parts by mass, 1,050 to 1,800 parts by mass, and 1,100 to 1,700 parts by mass. In these ranges, kneading a lump with rubber or compounding agents quickly produces even kneaded product. In terms of the properties of a rubber product produced by adding lump and crosslinking, it is preferably not more than 1,600 parts by mass, more preferably not more than 1,500.

The lump of the present invention includes a large amount of plasticizers with not less than 750 parts by mass for 100 parts by mass of a copolymer (X). Nonetheless, it produces a lump with less deformation due to its weight and stickiness due to leaking. Such lump is useful as a compounding agent.

The Mooney viscosity [ML (1+4) 125° C.] of the lump of the present invention measured at 125° C. in accordance with JIS K 6300 using a Mooney viscometer (SMV202 manufactured by Shinmadzu Corporation) is usually not greater than 10. Also, it is preferred that the viscosity is too low to measure the abovementioned Mooney viscosity.

Further, the intrinsic viscosity [η] of the lump of the present invention measured in a decalin solution of 135° C. is between 0.01 to 1.2 dl/g, preferably between 0.01 to 1.1 dl/g. Also, the lump may include other components besides the abovementioned copolymer (X) and plasticizer (Y) and there are no limits to the amounts. However, other components for modification are preferably present in small amounts in terms of using it as a modifier of viscosity and flexibility in producing a rubber product. For example, it is preferably not more than 10 parts by mass, and more preferably not more than 1 part by mass, for 100 parts by mass for the sum of (X) and (Y).

Production Method of Lumps

There is no limitation as to the production method of a lump. For example, a kneaded product with uniformly dispersed plasticizer (X) in the abovementioned copolymer (X) may be produced by adding the abovementioned plasticizer (Y) in the mixture comprising the abovementioned copolymer (X) and an organic solvent, and kneading and desolventizing it. A vent-type extruder is usually used in this method.

Examples of the abovementioned organic solvents include the conventionally known hydrocarbon solvents used in producing an ethylene copolymer (X) in solution polymerization method. Specific examples of these hydrocarbon solvents include aliphatic hydrocarbons such as pentane, hexane, heptane, octane, decane, dodecane, and kerosene, and their halogen derivatives, alicyclic hydrocarbons such as cyclohexane, methylcyclopentane, and methylcyclohexane, and their halogen derivatives, aromatic hydrocarbons such as benzene, toluene, and xylene, and halogen derivatives such as chlorobenzene. These solvents may be used alone, or two or more may be used in combination. Bale is obtained by installing bale molding apparatus to the front of the extruder.

[Composition (Z)]

In the present invention, composition (Z) refers to a composition that includes 1,001 to 2,000 parts by mass of plasticizer (Y) for 100 parts by mass of the abovementioned ethylene copolymer (X). Composition (Z) of the present invention exhibits excellent shaping processability and flexibility. It is preferred that composition (Z) of the invention have not less than 1,050 parts by mass, or not less than 1,100 parts by mass, of plasticizer (Y) for 100 parts by mass of the abovementioned ethylene copolymer (X).

The maximum content of plasticizer (Y) is preferably not more than 1,800 parts by mass, more preferably not more than 1,700 parts by mass, within which range composition (Z) rapidly produces an uniform kneaded product when added with rubber and compounding agents and kneaded. The upper limit is not more than 1,600 parts by mass, preferably not more than 1,500 parts by mass in terms of the properties of the rubber product produced from composition (Z) addition.

Composition (Z) of the present invention has a very large amount of plasticizer (Y) in not less than 1,001 parts by mass compared to the conventionally known ethylene copolymer composition. However, there is low possibility that plasticizer (Y) will leak from the composition, and it also has excellent shape retention.

The Mooney viscosity [ML (1+4) 125° C.] of ethylene copolymer composition (Z) measured at 125° C. in accordance with JIS K 6300 using a Mooney viscometer (SMV202 manufactured by Shinmadzu Corporation) is usually not more than 10. It is also preferred that the viscosity is too low to measure its Mooney viscosity.

Further, the intrinsic viscosity [η] of the composition measured in a decalin solution of 135° C. is between 0.01 to 1.2 dl/g, preferably 0.01 to 1.1 dl/g.

The abovementioned composition (Z) is produced by adding the abovementioned plasticizer (Y) to the copolymer (X) solution, and kneading and desolventizing it. The organic solvent and kneading method is as described above.

The composition may contain other components besides (X) and (Y). There are no limits to the amounts, but other components are preferably present in small amount for modification since it is used as a modifier of viscosity and flexibility in producing a rubber product. For example, the other components are present in not more than 10 parts by mass, preferably not more than 1 part by mass, for 100 parts by mass of the sum of (X) and (Y).

This describes a cold flow test, which tests the shape retention of the lump or composition (Z) of the present invention below. A test piece for the cold flow test may be obtained by melt-kneading the composition or lump for a small test piece (for cold flow test A or B below), or a small test piece may be cut out from the composition or lump (for cold flow test A1 or B1 below). Any cold flow test may be conducted using any of the method for obtaining a test piece because there are usually almost no differences between measurements between cold flow test A and A1, and between cold flow test B and B1.

[Cold Flow Tests A and B for Lump or Composition (Z) of the Present Invention]

(Cold Flow Test A)

To conduct this test for lump or composition (Z) of the present invention, melt-knead the lump or the composition so that the length and the width are 10 cm and the height is 3 cm. With the 10×10 surface facing down, leave the product at 23° C. for one week. The change in the length after one week is preferably not more than 15%, more preferably not more than 13%, and most preferably not more than 10%. The change in the width after one week is preferably not more than 15%, more preferably not more than 13%, and most preferably not more than 10%. Also, the rate of change in size after a cold flow test of the present specification can be represented by an absolute value of the result of 100× [(size after the cold flow test)−(size before the cold flow test)]/(size before the cold flow test).

(Cold Flow Test B)

To conduct this test, heat form the lump or composition (Z) of the present invention so that the length is 10 cm, the width is 1 cm, and the height is 0.2 cm. Hang the product with the longer side hanging vertically at 23° C. and leave it for one week. The change in the length is preferably not more than 20%, more preferably not more than 15%, and most preferably not more than 10%.

For the lump or composition (Z) of the present invention, it is preferred that the test results satisfy at least one of the preferred ranges of the cold flow test (A1) or the preferred ranges of the cold flow test (B1). It is more preferred that the test results satisfy the preferred ranges of both tests.

[Cold Flow Tests (A1) and (B1) for the Lump of the Present Invention]

(Cold Flow Test (A1))

To conduct this test, cut out a test piece from the lump or composition with a length and a width of 10 cm, and a height of 3 cm. Leave the piece with the 10×10 surface facing down at 23° C. for one week. The change in the width is preferably not more than 15%, more preferably not more than 13%, and most preferably not more than 10%. The change in the length is preferably not more than 15%, more preferably not more than 13%, and most preferably not more than 10%.

(Cold Flow Test (B1))

To conduct this test, cut out a test piece from the lump or composition with the length of 10 cm, the width of 1 cm, and the height of 0.2 cm. Hang the test piece with the longer side hanging vertically at 23° C. and leave it for one week. The change in the length is preferably not more than 20%, more preferably not more than 15%, and most preferably not more than 10%.

For the lump or composition (Z) of the present invention, it is preferred that the test results satisfy at least one of the preferred ranges of the cold flow test (A1) or the preferred ranges of the cold flow test (B1). It is more preferred that the test results satisfy the preferred ranges of both tests.

Although the lump or composition (Z) of the present invention may be blended with crosslinking agents and compounding agents, and then shaped and crosslinked to be used as a rubber product, it may be blended with other rubbers or rubber compounding agents to make a rubber composition, and then crosslinked as needed to produce a desired rubber product.

[Production Method of Rubber Composition]

In the production method of the rubber composition in relation to the present invention, the abovementioned lump or composition (Z) is melt-kneaded with rubber and compounding agents as needed.

There are no restrictions as to the type of rubber to be used (in some cases referred to as rubber (P)). Examples include polyisoprene rubber (IR), styrene butadiene copolymer rubber (SBR), butadiene rubber (BR), chloroprene rubber (CR), isoprene isobutylene copolymer rubber (IIR), acrylonitrile butadiene copolymer rubber (NBR), ethylene α-olefin copolymer rubber (EPM), ethylene α-olefin non-conjugated polyene copolymer rubber (EPDM), acrylic rubber, polyurethane rubber (PU), silicone rubber, fluoro-rubber and its modified rubber, chlorosulphonated polyethylene, halogenated polyethylene. Also, copolymer rubbers may be random copolymers or block copolymers.

Of these rubbers, ethylene.α-olefin copolymer rubber and ethylene α-olefin non-conjugated polyene copolymer rubber are preferred for a rubber shaped article that needs to have weather resistance, and ethylene α-olefin non-conjugated polyene copolymer rubber is more preferable because it exhibits excellent vulcanization performance.

[Ethylene.α-Olefin Copolymer Rubber and Ethylene α-Olefin Non-Conjugated Polyene Copolymer Rubber]

Ethylene.α-olefin copolymer rubber, preferred for rubber (P) in relation to the present invention, is a copolymer rubber comprising units derived from ethylene and units derived from α-olefin having more than 3 carbon atoms, preferably between 3 to 20 carbon atoms. Further, ethylene α-olefin non-conjugated polyene copolymer rubber, used as rubber (P) in relation to the present invention, is a copolymer rubber comprising units derived from ethylene, units derived from α-olefin having more than 3 carbon atoms, preferably between 3 to 20 carbon atoms, and units derived from non-conjugated polyene.

Specific examples of α-olefins include propylene, 1-butene, 4-methylpentene-1,1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyldecene-1, 11-methyldodecene-1, and 12-ethyltetradecene-1. Of these, propylene, 1-butene, 4-methylpentene-1,1-hexene, and 1-octene are preferred, and propylene is more preferred.

These α-olefins may be used alone, or two or more may be used in combination.

Further, specific examples of non-conjugated polyenes include chain non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, and 4-ethylidene-1,7-undecadiene; cyclic non-conjugated dienes such as methyltetrahydrindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-norbornene, 5-isopropenyl-2-norbornene, 5-isobutenyl-2-norbornene, cyclopentadiene, and norbornadiene; and trienes such as 2,3-diisopropylidene-5-norbornene, 2-ethylidene-3-isopropylidene-5-norbornene, 2-propenyl-2,2-norbornadiene, and 4-ethylidene-8-methyl-1,7-nornadiene. Of these, 5-ethylidene-2-norbornene and 5-vinyl-2-norbornene are preferred.

These non-conjugated polyenes may be used alone, or two or more may be used in combination.

Ethylene.α-olefin copolymer rubber and ethylene α-olefin non-conjugated copolymer rubber, both preferred for rubber (P) in relation to the present invention, has a molar ratio [(A)/(B)] of composition units derived from ethylene (A) to composition units derived from α-olefin (B) from 50/50 to 90/10, preferably 50/50 to 85/15, and mass % of the composition units derived from non-conjugated polyene (C) per 100 mass % of a total of the structural unit derived from [A], the structural unit derived from [B], and the structural unit derived from [C] from 1.0 mass % to 20.0 mass %, preferably from 3.0 mass % to 15 mass %, and more preferably from 4.0 mass % to 14 mass %.

In ethylene.α-olefin copolymer rubber and ethylene α-olefin non-conjugated copolymer rubber, which are preferred for rubber (P) in relation to the present invention, an intrinsic viscosity [η], measured at 135° C. in decalin, is usually from 1.0 to 5.0 dl/g, preferably from 1.0 to 4.0 dl/g.

Specific examples of ethylene.α-olefin copolymer rubber and ethylene α-olefin non-conjugated copolymer rubber, preferably used as rubber (P) in relation to the present invention, include ethylene propylene 5-ethylidene-2-norbornene random copolymer and ethylene propylene 5-ethylidene-2-norbornene 5-vinyl-2-norbornen random copolymer.

Such rubber (P) is mixed with the abovementioned lump or composition, and there is no restriction as to the mix ratio. If the sum of rubber (P) and the abovementioned ethylene copolymer (X) is 100 parts by mass, the content of rubber (P) is from 50 mass % to 99 mass %, preferably from 60 to 99 mass %, more preferably from 70 to 99 mass %, and most preferably from 80 to 99 mass %.

The rubber composition may contain compounding agents. In the description of compounding agents below, the amount of compounding agents is given for 100 parts by mass of the sum of rubber (P) and ethylene copolymer (X) derived from the abovementioned lump or composition (hereinafter referred to as the "total rubber component") for convenience purposes.

Reinforcing Agents

There are no limits to reinforcing agents, as long as they are usually used to reinforce synthetic rubber. Examples of such reinforcing agents include carbon blacks such as SRF, GPF, FEF, MAF, HAF, ISAF, SAF, FT, and MT, silica, activated calcium carbonate, light calcium carbonates, heavy calcium carbonates, finely powdered talc, finely powdered silicic acid, talc, and clay, as well as products obtained by surface-treating these inorganic substances with silane-coupling agents. Examples of commercially available carbon blacks include Asahi #55G, Asahi #50HG, Asahi #60G (names of products manufactured by Asahi Carbon Co., Ltd.), Seast V, and Seast S0 (names of products manufactured by Tokai Carbon Co., Ltd.). The specific surface areas of such reinforcing agents are preferably between 5 and 120 m$^2$/g. In the present invention, carbon black or silica is preferred for the improvement of rigidity.

For the total rubber component of 100 parts by mass, the amount of the reinforcing agent is 5 to 200 parts by mass, preferably 10 to 190 parts by mass, more preferably 20 to 190 parts by mass.

If the reinforcing agent added in these ranges, the shaped article produced by vulcanizing exhibits excellent rigidity, mechanical strength, and kneading processability.

Crosslinking Agent

The rubber composition may have crosslinking agents added. Examples of crosslinking agents include vulcanizing agents such as sulfur and sulfur compounds, and organic peroxides.

Examples of the above crosslinking agents include vulcanizing agents, vulcanization accelerators, and vulcanization aids.

Examples of the above vulcanizing agents include sulfur compounds, organic peroxides, phenolic resins, and oxime compounds.

Sulfur Compounds

Preferred examples of the above sulfur compounds include sulfur, sulfur chloride, sulfur dichloride, morpholine disulfide, alkylphenol disulfide, tetramethylthiuram disulfide, and selenium dithiocarbamate. Of these, sulfur and tetramethylthiuram disulfide are more preferred.

The amount of addition of sulfur compounds to the total rubber component of 100 parts by mass is usually 0.1 to 10 parts by mass. If the added amount is within the above range, the crosslinked product will exhibit excellent mechanic properties.

Organic Peroxides

The organic peroxides are preferably dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butylperoxide, di-t-butylperoxy-3,3,5-trimethylcyclohexane, and di-t-butylhydroperoxide, and more preferably dicumyl peroxide, di-t-butylperoxide, and di-t-butylperoxy-3,3,5-trimethylcyclohexane.

The amount of organic peroxides added is usually 0.001 to 0.05 mol for 100 g of the total rubber component. It is preferred that the added amount of organic peroxides is within this range because the crosslinked product will exhibit excellent mechanical properties.

The vulcanizing agents described above may be used alone, or two or more may be used together.

When sulfur compounds are used as a vulcanizing agent, it is preferred that vulcanization accelerators are used together.

Vulcanization Accelerators

Examples of the vulcanization accelerators include thiazole compounds such as N-cyclohexylbenzothiazole-2-sulfenamide (e.g. "Sanceler CM" (product name; manufactured by Sanshin Chemical Industry Co., Ltd.)), N-oxydiethylene-2-benzothiazolesulfenamide, N,N'-diisopropyl-2-benzothiazolesulfenamide, 2-mercaptobenzothiazole (e.g. "Sanceler M" (product name; manufactured by Sanshin Chemical Industry Co. Ltd.)), 2-(4-morpholinodithio)benzothiazole (e.g. "Nocceler MDB-P" (product name; manufactured by Sanshin Chemical Industry Co. Ltd.)), 2-(2,4-dinitrophenyl) mercaptobenzothiazole, 2-(2,6-diethyl-4-morpholinothio) benzothiazole, dibenzothiazyldisulfide, and cyclohexylamine salt of 2 mercaptobenzothiazole (e.g. "Sanceler HM" (Product name; manufactured by Sanshin Chemical Industry Co., Ltd.), guanidine compounds such as diphenylguanidine, triphenylguanidine, and diorthotolylguanidine; aldehyde amine compounds such as acetaldehyde aniline condensate and butylaldehyde-aniline condensate; imidazoline compounds such as 2-mercaptoimidazoline; thiourea compounds such as diethylthiourea and dibutylthiourea; thiuram compounds such as tetramethylthiuram monosulfide (e.g. "Nocceler TS" (product name; manufactured by Ouchi Shinko Chemical Industrial Co. Ltd.)), tetramethylthiuram disulfide (e.g. "Sanceler TT" (product name; manufactured by Sanshin Chemical Industry Co., Ltd.)), tetraethylthiuram disulfide (e.g. "Sanceler TET" (product name; manufactured by Sanshin Chemical Industry Co., Ltd.)), dipentamethylenethiuram tetrasulfide (e.g. "Sanceler TRA" (product name; manufactured by Sanshin Chemical Industry Co., Ltd.)), and tetrakis(2-ethylhexyl)thiuram disulfide (e.g. "Nocceler TOT" (product name; manufactured by Ouchi Shinko Chemical Industrial Co., Ltd.)); dithioic acid salt compounds such as zinc dimethyldithiocarbamate (e.g. "Sanceler PZ" (product name; manufactured by Sanshin Chemical Industry Co., Ltd.)), zinc diethyldithiocarbamate, zinc dibutyldithiocarbamate (e.g. "Sanceler BZ" (product name; manufactured by Sanshin Chemical Industry Co., Ltd.)), tellurium diethyldithiocarbamate (e.g. "Sanceler TE"

(product name; manufactured by Sanshin Chemical Industry Co., Ltd.)), and zinc dibenzyldithiocarbamate (e.g. "Nocceler ZTC" (product name; manufactured by Ouchi Shinko Chemical Industrial Co., Ltd.)); thiourea compounds such as ethylenethiourea (e.g. "Sanceler 22-C" (product name; manufactured by Sanshin Chemical Industry Co., Ltd.)), and N,N'-diethylthiourea (e.g. "Sanceler BUR" (product name; manufactured by Sanshin Chemical Industry Co., Ltd.)); xanthate compounds such as zinc dibutylxanthate; and others such as Chinese white (e.g. META-Z102 (product name; manufactured by Inoue Calcium Corporation, zinc oxide)).

The amount of vulcanization accelerators added is usually 0.1 to 20 parts by mass for 100 parts by mass of the total rubber component. Vulcanization accelerators may be used alone, or two or more may be used in combination. The added amount of these vulcanizing agents and vulcanization accelerators are preferably within the ranges above because the crosslinked products will exhibit excellent mechanical properties.

Vulcanization Aids

Examples of vulcanization aids that are cited as examples of the crosslinking agents above include quinone dioxime vulcanization aids such as p-quinone dioxime; acrylic vulcanization aids such as ethyleneglycoldimethacrylate and trimethylolpropanetrimethacrylate; allyl vulcanization aids such as diallylphthalate and triallyl isocyanurate (e.g. M-60 (product name; manufactured by Nippon Kasei Chemical Co., Ltd.)); other maleimide vulcanization aids; divinylbenzene; zinc oxide, and magnesium oxide/Chinese white (e.g. META-Z102 (product name; manufactured by Inoue Calcium Corporation)). These vulcanization aids may be selected appropriately for their purposes.

Vulcanization aids may be used alone, or two or more may be used in combination.

The amount of vulcanization aids added are usually 1 to 50 parts by mass for 100 parts by mass of the total rubber component.

Other Components

The rubber composition relating to the present invention may include various compounding agents that are commonly used in the production of rubber products, depending on the use and performance of desired vulcanizate. Examples include softeners, anti-aging agents, process aids, alkoxysilane compounds, activating agents, reaction inhibitor, coloring agents, dispersing agents, flame retardants, plasticizers, antioxidants, antiscorching agents, UV absorbents, antistatic agents, lubricants, mold-inhibiting agents, peptizing agents, tackifiers, various dyes such as disperse dyes and acid dyes, inorganic or organic pigments, surfactants, paints, compounds for foaming such as foaming agents and foaming aids, and defoaming agents. These compounding agents may be appropriately selected as long as they do not undermine the purpose of this invention, and appropriate amounts may be added.

Softeners

The softeners that are commonly used in rubber can be used, including plasticizers such as oils as described above. Specific examples include petroleum softeners such as process oils, lubricating oils, paraffin, liquid paraffins, petroleum asphalts, and vaseline; coal tar softeners such as coal tars and coal tar pitches; fatty oil softeners such as castor oil, linseed oil, canola oil, and coconut oil; tall oils; rubber substitutes; waxes such as beeswax, carnauba wax, and lanolin; fatty acids and fatty acid salts such as ricinoleic acid, palmitic acid, barium stearate, calcium stearate, and zinc laurate; and synthetic polymer substances such as petroleum resins, atactic polypropylene, and coumarone indene resins. Of these, petroleum softeners are preferred, especially process oil.

The amount of softeners added may be appropriately set for the use of the rubber shaped article. Usually, the sum of plasticizers derived from the lump or composition (Z) of the present invention and softeners for 100 parts by mass of the total rubber component is not more than 1,000 parts by mass and preferably not more than 900 parts by mass. It is also usually not less than 10 parts by mass and preferably not less than 100 parts by mass. According to this invention, it is possible to add a large amount of softeners that was previously not thought to be possible to have good workability, and flexible crosslinked rubber may be produced because the kneaded product has great binding ability even after kneading.

Anti-Aging Agents

Using anti-aging agents extends the life of materials. This is same as with any rubber.

Examples of anti-aging agents used in this invention include aromatic secondary amine stabilizers such as phenylnaphthylamine, 4,4'-(α,α-dimethylbenzyl)diphenylamine, and N,N'-di-2-naphthyl-p-phenylenediamine; phenolic stabilizers such as 2,6-di-t-butyl-4-methylphenol and tetrakis-[methylene-3-(3',5'-di-t-butyl-4'-hydroxyphenyl) propionate]methane; thioetheric stabilizers such as bis[2-methyl-4-(3-n-alkylthiopropionyloxy)-5-t-butylphenyl]sulfide; benzoimidazolic stabilizers such as 2-mercaptobenzoimidazole; dithiocarbamate stabilizers such as nickel dibutyldithiocarbamate; and quinolinic stabilizers such as polymers of 2,2,4-trimethyl-1,2-didihydroquinoline. These anti-aging agents may be used alone, or two or more may be used in combination.

Although these anti-aging agents are usually not more than 5 parts by mass for 100 parts by mass of the total rubber component and preferably not more than 3 parts by mass, it is preferred that the optimal amount is appropriately chosen depending on the desired material properties.

Process Aids

The compounds that are commonly used in processing rubber as process aids may be used. Specific examples include higher fatty acids such as ricinoleic acid, stearic acid, palmitic acid, and lauric acid, salts of higher fatty acids such as barium stearate, zinc stearate, and calcium stearate, and esters of higher fatty acids such as ricinoleate ester, stearate ester, palmitate ester, and laurate ester.

The amount of these process aids for 100 parts by mass of the total rubber component is usually not more than 10 parts by mass and preferably not more than 5 parts by mass, but it is preferred that the optimal amount is chosen appropriately for desired material properties.

Foaming Agents and Foaming Aids

The rubber shaped articles described below may be produced by adding foaming agents and foaming aids that are commonly used for rubber in the rubber composition related to this invention as needed, and by shaping, foaming and vulcanizing the composition thereafter.

Specific examples of foaming agents include inorganic foaming agents such as sodium bicarbonate, sodium carbonate, ammonium bicarbonate, ammonium carbonate, ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azodiaminebenzene, and barium azodicarboxylate; sulfonylhydrazide compounds such as benzenesulfonylhydrazide, toluenesulfonylhydrizide, p,p'-oxybis (benzenesulfonylhydriazide), and diphenylsulfone-3,3'-disulfonylhydrazide; and azide compounds such as calcium azide, 4,4-diphenyldisulfonylazide and p-toluenesulfonylazide.

The amount of these foaming agents are 0.5 to 30 parts by mass for 100 parts by mass of the total rubber component and preferably 1 to 20 parts by mass. Foaming aids, which are used alongside foaming agents as needed, lower the decomposition temperature of the foaming agents, facilitates the decomposition, and makes cells uniform. Examples of these foaming aids include organic acids such as salicylic acid, phthalic acid, stearic acid, and oxalic acid, and urea and derivatives thereof.

The amount of these foaming aids is usually 0.01 to 10 parts by mass for 100 parts by mass of the total rubber component and preferably 0.1 to 5 parts by mass. Here, the optimal amount may be chosen according to the desired material properties.

Defoaming Agents

When compounded rubber is vulcanized, bubbles may form due to moisture inside, or foaminess may change. To prevent this, calcium oxide may be used as a defoaming agent.

The amount of defoaming agents is usually not more than 20 parts by mass for 100 parts by mass of the total rubber component and preferably not more than 10 parts by mass. Here, the optimal amount may be chosen according to the desired material properties To make the rubber composition, the lump or composition (Z) and rubber are kneaded using internal mixers such as Banbury mixer, kneader, or Intermix mixer, with softeners (extender oil), process aids, or vulcanization accelerator as needed, for 2 to 20 minutes at 80 to 170° C. The resultant blend is then kneaded with softeners, vulcanizing agents (such as sulfur), and vulcanization accelerators, and additives such as foaming agents and crosslinking agents as needed, using rolls such as open rolls or kneaders, with additional compounding agents such as vulcanization accelerators, crosslinking aids, foaming aids, and defoaming agents as needed, for 5 to 30 minutes at rolling temperature of 40 to 80° C. The resultant mixture is discharged. The rubber composition can be thus prepared.

Production Method of Rubber Shaped Article

The rubber shaped article is obtained by crosslinking the rubber composition of the present invention, and it can be foaming shaped article. To produce the rubber shaped article from the inventive rubber composition, non-crosslinked compounded rubber is made as described, just as in cross-linking any rubber, and then the compounded rubber is shaped into a desired shape before crosslinking. The non-crosslinked rubber composition obtained through the method above can be shaped and crosslinked using a variety of shaping methods, but its properties are exhibited best when it is shaped and crosslinked by die forming such as compression molding, injection molding, and slip casting.

In compression molding, a measured amount of non-crosslinked compounded rubber is put in to a mold and then heated for 30 seconds to 120 minutes at 120 to 270° C. to obtain the desired crosslinked rubber shaped article. In injection molding, a measured amount of ribbon-like or pellet-like compounded rubber is put in the pot with a screw. The preheated compounded rubber is put in the mold with a plunger for 1 to 20 seconds. After injection, the compounded rubber is heated for 30 seconds to 120 minutes at 120 to 270° C. to obtain the desired rubber shaped article.

In slip casting, a measured amount of compounded rubber is put in a pot and then poured into a mold with a piston for 1 to 20 seconds. Afterwards, the compounded rubber is heated for 30 seconds to 120 minutes at 120 to 270° C. to obtain the desired rubber shaped article.

The inventive lump or compound (Z) combines particular ethylene copolymer (X) with plasticizer (Y), so an uniform kneaded product can be quickly obtained when kneaded with other rubber or compounding agents.

Further, when adding with the rubber compound, plasticizers may be added when kneading with other components. It is possible to knead with high productivity even with a large amount of plasticizers (oil) that was not considered previously with rubber shaped articles, and to produce flexible crosslinked rubber.

The resultant crosslinked rubber will exhibit excellent flexibility and stretchability.

(Use of Vulcanized Rubber)

The crosslinked rubber obtained through the production method in the present invention can be used widely, for areas requiring low hardness. Specifically, they can be used for automobile parts, marine vessel parts, civil engineering and building parts, medical parts, electric and electronic appliance parts, transport machine parts, leisure goods, hoses (such as radiator hoses and heater hoses), vibration-proof rubbers, sheets, various belts, various packings, sealing materials, potting materials, and coating materials.

EXAMPLES

Examples of this invention are described below. Here, the invention is not limited to these examples.

The properties of ethylene copolymers obtained in examples and comparative examples were measured using the following methods.

[Molar Amount (C2") of the Structural Unit Derived from Ethylene [A]]

The amount was determined by measuring the intensity with a $^1$H-NMR spectrometer.

[Molar Amount of the Structural Unit Derived from Non-Conjugated Polyene [C]]

The amount was determined by measuring the intensity with a $^1$H-NMR spectrometer.

[Mooney Viscosity of the Composition]

The Mooney viscosity was measured at 125° C. using a Mooney viscometer (SMV202 manufactured by Shinmadzu Corporation) in accordance with JIS K 6300.

[Intrinsic Viscosity]

The intrinsic viscosity was measured in a decalin solution of 135° C.

[Cold Flow Test A]

Using a mold of 10 cm×10 cm×3 cm, a small piece was taken from the lump for press molding, which was heated using a press forming machine for 6 minutes at 190° C., pressurized for 4 minutes at 190° C. (50 kg/cm$^2$), and then pressurized again for 5 minutes at 20° C. (50 kg/cm$^2$) to obtain a test piece.

The test piece of 10 cm×10 cm×3 cm was left in room temperature for one week, with the 10 cm×10 cm side facing down, and the rates of change in the length and the width were evaluated.

[Cold Flow Test B]

Using a mold of 10 cm×10 cm×0.2 cm, a small piece was taken from the lump for press molding. It was heated using a press forming machine for 6 minutes at 190° C., pressurized for 4 minutes at 190° C. (50 kg/cm$^2$), and then pressurized again for 5 minutes at 20° C. (50 kg/cm$^2$) to obtain a sheet. It was punched with a punch blade of 10 cm×1 cm to obtain a strip-form test piece with a length of 10 cm, a width of 1 cm, and a height of 0.2 cm. One end of the test piece was held by a binder clip (pea size; holding with of 13 mm), product number CS-P31 (manufactured by Lion Office Products Corp.), and the handles were placed on a hook so that the test piece would hang vertically. It was left for 1 week at 23° C., and the rate of change in the length was evaluated. The measurements were done before and after the cold flow test, with the test piece hung.

[Surface]

The surface was observed with the visual contact and by touching and feeling.

Example 2

In a hexane solvent, 100 parts by mass of ethylene copolymer ([η]=9.5 dl/g, C2"=73 mol %, ENB-IV (iodine value)=10 g/100 g, ENB content: 1.3 mol %, value B=1.0), as component (X), and 900 parts by mass of "Diana Process Oil PW-100," as component (Y), were stirred at 80° C. with 1.6 MPaG to obtain a solution (hexane: 60 wt %, ethylene copolymer+PW-100: 40 wt %) containing component (X) and component (Y). The resultant solution containing component (X) and component (Y) were flash dried, pelletized with an underwater cutter on an extruder, and the pellet was pressed to produce bale in order to obtain the lump (oil MB-1).

Examples 1, 3, and 4

The lump was obtained using the same method as Example 2, except for changing the parts by mass of component (Y). The material properties, cold flow test results, and the observed data from the surface of the resultant solid lump are summarized in Table 1.

Comparative Examples 1 and 2

The material properties, cold flow test results, and the observed data from the surface of Mitsui EPT X-4010 (([η]=1.0 dl/g, C2"=72 mol %, ENB-IV=22 g/100 g, ENB content: 3.0 mol %) and Lucant HC-2000 (product name; manufactured by Mitsui Chemicals, Inc.) are summarized in Table 1.

Comparative Example 3

In a hexane solvent, 100 parts by mass of Mitsui EPT 3092M ([η]=2.4 dl/g, C2"=77 mol %, ENB-IV=10 g/100 g, ENB content: 1.3 mol %), as component (X), and 100 parts by mass of "Diana Process Oil PW-100," as component (Y), were stirred at 80° C. with 1.6 MPaG to obtain a solution (hexane: 60 wt %, ethylene copolymer+PW-100: 40 wt %) containing component (X) and component (Y). The resultant solution containing component (X) and component (Y) were flash dried, pelletized with an underwater cutter on an extruder, and the pellet was pressed to produce bale in order to obtain the lump (oil MB-2). The material properties, cold flow test results, and the observed data from the surface of the oil MB-2 is summarized in Table 1.

TABLE 1

|  | Com Ex. 1 | Com Ex. 2 | Com Ex. 3 (Oil MB-2) | Ex. 1 | Ex. 2 (Oil MB-1) | Ex. 3 | Ex. 4 |
|---|---|---|---|---|---|---|---|
| <Compositions> [phr] | | | | | | | |
| UHMW-EPT | | | | 100 | 100 | 100 | 100 |
| PW-100 | | | 100 | 800 | 900 | 1200 | 1500 |
| 3092M | | | 100 | | | | |
| X-4010 | 100 | | | | | | |
| HC-2000 | | 100 | | | | | |
| <Properties> | | | | | | | |
| ML (1 + 4) 100° C. | 8 | 0 (measurement infeasible) | 30 | 5 | 3 | 0 (measurement infeasible) | 0 (measurement infeasible) |
| [η] [dl/g] | 1.0 | 0.19 | 1.60 | 1.0 | 0.78 | 0.33 | 0.14 |
| Cold Flow Test (Shape Retention) | Conditions: Room temperature × 1 week | | | | | | |
| Change when a lump of 10 cm × 10 cm × 3 cm was left | 12 cm × 12 cm × 2 cm | the Shape Impossibility about a Liquid Form | 12 cm × 12 cm × 2 cm (Greasy) | 10 cm × 10 cm × 3 cm (Without Deformation) | 10 cm × 10 cm × 3 cm (Without Deformation) | 10 cm × 10 cm × 3 cm (Without Deformation) | 10 cm × 10 cm × 3 cm (Without Deformation) |
| Length change when 10 cm × 1 cm × 0.2 cm strip form was suspended | 23 cm | the Shape Impossibility about a Liquid Form | 20 cm (Dripping of the Oil) | 10 cm (Without Elongation) | 10 cm (Without Elongation) | 10 cm (Without Elongation) | 10 cm (Without Elongation) |
| Surface | No Stickiness | — | a Large Amount of Oil Bleeding | No Stickiness | No Stickiness | No Stickiness | No Stickiness |

UHMW-EPT: [η] = 9.5 dl/g, C2" = 73 mol %, ENB-IV = 10 g/100 g, ENB content = 1.3 mol %, Value B = 1.0
3092M: [η] = 2.4 dl/g, C2" = 77 mol %, ENB-IV = 10 g/100 g, ENB content = 1.3 mol %
X-4010: [η] = 1.0 dl/g, C2" = 72 mol %, ENB-IV = 22 g/100 g, ENB content = 3.0 mol %
HC-2000: EPR, [η] = 0.19 dl/g, C2" = 53 mol %

Comparing Example 1 with comparative examples, [η] is the same, but the lump of Example 1 has great shape retainability and the surface is also excellent. Further, as in Comparative Example 3, when the intrinsic viscosity of copolymer is low, a large amount of plasticizer can not be contained. The shape retainability and surface are also inadequate.

Examples 2 to 4 have larger amounts of plasticizer. In this invention, 1,500 parts by mass is considered a large amount, but the resultant lumps exhibited excellent shape retainability and great surface.

Example 5

Added together were 95 parts by mass of Mitsui EPT 3092M (([η]=2.4 dl/g, C2"=77 mol %, ENB-IV=10 g/100 g, ENB content: 1.3 mol %), 50 parts by mass of oil MB-1, 5 parts by mass of zinc oxide as an activating agent, 2 parts by mass of stearic acid as a process aid, 1 part by mass of PEG #4000 (product name; manufactured by Lion Corporation), 135 parts by mass of "Diana Process Oil PW-100" (product name; manufactured by Idemitsu Kosan Co., Ltd.) as a softner, 110 parts by mass of "Asahi 50G" (product name; manufactured by Asahi Carbon Co., Ltd.) as a reinforcing agent, 40 parts by mass of Whiton SB Red (product name; manufactured by Bihoku Funka Kogyo Co., Ltd.) as a filler, and 30 parts by mass of Hakuenka CC (product name; manufactured by Shiraishi Kogyo). It was then kneaded in 1.7-L Banbury mixer until kneading torque reached a peak and kneaded for two minutes after torque peak was reached, and rubber composition was discharged from the mixer. State of rubber composition was observed. It took 16 minutes for torque to reach the peak. The resultant rubber composition is called "mixed rubber composition A."

Afterwards, To mixed rubber composition A, added together were 0.75 part by mass of sulfur as a vulcanizing agent, 0.75 part by mass of 4,4-dithio dimorpholine as a vulcanization accelerator, 0.2 part by mass of tellurium diethyl.dithiocarbamic acid, 1.0 part by mass of ethylene.thiourea, 1.0 part by mass of N-cyclohexyl-2-benzothiazyl.sulfenamide, and 2.0 parts by mass of zinc di-n-butyl-.dithiocarbamic acid. It was kneaded in a 6-inch roll (roll surface temperature: 50° C.) to obtain a rubber composition. The resultant rubber composition is called "compounded rubber" or "mixed rubber composition B."

The compounded rubber was shaped into a sheet with a thickness of 2 mm using a press forming machine, and it was immediately heated for 15 minutes at 170° C. to obtain a crosslinked product. The material properties of this crosslinked product is summarized in Table 2.

Kneading State

Kneading time, which shows the kneading state, is the time until torque starts reducing after reaching its peak. Kneading time was measured using the built-in torque detector with mixer, and the changes in torque over time were recorded in a chart. In this experiment, kneading time was two minutes after torque reaches its peak. Shorter kneading time means that it is easier to knead. Also, the binding ability at discharge was observed with the visual contact during extraction after kneading.

Characteristics are summarized below.

Hardness Test

The hardness (type A durometer, HA) of rubber shaped articles was measured with a stack of a thickness of approximately 12 mm, which consisted of six sheets of 2 mm-thick rubber shaped articles (crosslinked products) having flat surfaces stacked on top of one another. Here, the test pieces having contaminations, bubbles, or scratches were rejected. The size of the measurement face of the test piece was such that the measurement could be performed while the tip of the probe was placed at a position at least 12 mm away from the end of the test piece.

Tensile Test

Rubber shaped articles (crosslinked products) were subjected to a tensile test at a measurement temperature of 23° C. and a stress rate of 500 mm/min in accordance with JIS K 6251 to determine the tensile strength at break (TB) and the elongation at break (EB).

Examples 6 to 8

Mutsui EPT 3092M, oil MB-1, and softener "Diana Process Oil PW-1" were in the same amount as Table 2, and were kneaded just as in Example 5. The kneading discharge was observed afterwards. Also, the crosslinked products were obtained with mixed rubber composition B just as in Example 5. The material properties of the crosslinked products are summarized in Table 2.

Comparative Examples 4 and 5

Mutsui EPT 3092M, oil MB-2, and softener "Diana Process Oil PW-100" were in the same amount as the table, and were kneaded just as in Example 5. The kneading discharge was observed afterwards. Also, the crosslinked products were obtained with mixed rubber composition B just as in Example 5. The material properties of the crosslinked products are summarized in Table 2.

TABLE 2

| | | | Com Ex. 4 | Com Ex. 5 | Ex. 5 | Ex. 6 | Ex. 7 | Ex. 8 |
|---|---|---|---|---|---|---|---|---|
| <Combination> | | | | | | | | |
| (A) | | 3092M | 100 | 75 | 95 | 90 | 90 | 85 |
| | | X-4010M | | | | | | |
| | | Oil MB-1 | | | 50 | 100 | 100 | 150 |
| | | UHMW-EPT | | | 5 | 10 | 10 | 15 |
| | | PW-100 | | | 45 | 90 | 90 | 135 |
| | | Oil MB-2 | 50 | | | | | |
| | | 3092M | | 25 | | | | |
| | | PW-100 | | 25 | | | | |
| | | Chinese white No. 1 | 5 | 5 | 5 | 5 | 5 | 5 |
| | | Stearic Acid | 2 | 2 | 2 | 2 | 2 | 2 |
| | | PEG#4000 | 1 | 1 | 1 | 1 | 1 | 1 |

TABLE 2-continued

|  | | Com Ex. 4 | Com Ex. 5 | Ex. 5 | Ex. 6 | Ex. 7 | Ex. 8 |
|---|---|---|---|---|---|---|---|
| | Asahi#50G | 110 | 110 | 110 | 110 | 110 | 110 |
| | PW-100 (post-added) | 180 | 155 | 135 | 90 | 140 | 165 |
| | Whiton SB | 40 | 40 | 40 | 40 | 40 | 40 |
| | Hakuenka #CC | 30 | 30 | 30 | 30 | 30 | 30 |
| | Total Oil | 180 | 180 | 180 | 180 | 230 | 300 |
| (B) | BZ | 2 | 2 | 2 | 2 | 2 | 2 |
| | CM | 1 | 1 | 1 | 1 | 1 | 1 |
| | 22-C | 1 | 1 | 1 | 1 | 1 | 1 |
| | TE-G | 0.2 | 0.2 | 0.2 | 0.2 | 0.2 | 0.2 |
| | SANFEL R | 0.75 | 0.75 | 0.75 | 0.75 | 0.75 | 0.75 |
| | Sulfur | 0.75 | 0.75 | 0.75 | 0.75 | 0.75 | 0.75 |
| <Kneading> | | | | | | | |
| Kneading Time[min] | | 40 | 35 | 18 | 15 | 20 | 25 |
| Discharge Binding Ability | | Very Bad Natto Shape | Very Bad Natto Shape | Excellent | Excellent | Excellent | Excellent |
| <Normal Physical Properties> | | | | | | | |
| Hardness(shoreA) | | 40 | 40 | 40 | 40 | 30 | 20 |
| TB[MPa] | | 8.8 | | 9.9 | 10.5 | 4.0 | 3.2 |
| EB[%] | | 680 | | 700 | 720 | 800 | 810 |

It is difficult to knead with Comparative Examples 4 and 5, and it has poor discharge binding ability. Also, "natto shape" means that EPT lumps are showing in the oil. This indicates that when the intrinsic viscosity of the copolymer is low, an even kneaded product cannot be obtained only by increasing the amount of plasticizer for the master batch. In Examples 5 and 6, the total amount of oil (plasticizer) is the combined amount of Comparative Examples 4 and 5, and it has a short kneading time and discharge binding ability is also excellent. According to Examples 7 and 8, the amount of oil can be increased, and crosslinked rubber with low hardness can be obtained.

The invention claimed is:

1. A lump comprising 100 parts by mass of ethylene copolymer (X) which comprises a structural unit derived from ethylene [A], a structural unit derived from α-olefin [B] having 3 to 20 carbon atoms, and a structural unit derived from at least one component [C] selected from the group consisting of (c-1) polyene and (c-2) cyclic olefin, and which satisfies (1) to (3) below, and 1,100 to 2,000 parts by mass of plasticizer (Y); wherein
   (1) the structural unit derived from ethylene [A] represents 50 to 90 mol % in 100 mol % of a total of the structural unit derived from component [A], the structural unit derived from component [B], and the structural unit derived from component [C] in copolymer (X),
   (2) the structural unit derived from component [C] represents 1.0 to 5.0 mol % in 100 mol % of a total of the structural unit derived from component [A], the structural unit derived from component [B], and the structural unit derived from component [C] in copolymer (X), and
   (3) an intrinsic viscosity [η] of ethylene copolymer (X) measured in a decalin solution of 135° C. is 7.8 to 13.0 dl/g.

2. The lump according to claim 1, wherein an intrinsic viscosity [η] of plasticizer (Y) measured in a decalin solution of 135° C. is not more than 0.2 dl/g.

3. The lump according to claim 1, which has a mass of 1 kg to 100 kg.

4. The lump according to claim 1, wherein the lump is bale.

5. A composition (Z) comprising 100 parts by mass of ethylene copolymer (X) which comprises a structural unit derived from ethylene [A], a structural unit derived from α-olefin [B] having 3 to 20 carbon atoms, and a structural unit derived from at least one component [C] selected from the group consisting of (c-1) polyene and (c-2) cyclic olefin, and which satisfies (1) to (3) below, and 1,100 to 2,000 parts by mass of plasticizer (Y); wherein
   (1) the structural unit derived from ethylene [A] represents 50 to 90 mol % in 100 mol % of a total of the structural unit derived from component [A], the structural unit derived from component [B], and the structural unit derived from component [C] in copolymer (X),
   (2) the structural unit derived from component [C] represents 1.0 to 5.0 mol % in 100 mol % of a total of the structural unit derived from component [A], the structural unit derived from component [B], and the structural unit derived from component [C] in copolymer (X), and
   (3) an intrinsic viscosity [η] of ethylene copolymer (X) measured in a decalin solution of 135° C. is 7.8 to 13.0 dl/g.

6. The composition according to claim 5, wherein an intrinsic viscosity [η] of plasticizer (Y) measured in a decalin solution of 135° C. is not more than 0.2 dl/g.

7. A production method of a rubber composition comprising melt kneading the lump described in claim 1, a rubber, and compounding agents as needed.

8. The production method of a rubber composition according to claim 7, wherein the rubber comprises an ethylene α-olefin non-conjugated polyene copolymer.

* * * * *